United States Patent
Rensberger et al.

(10) Patent No.: US 7,688,780 B2
(45) Date of Patent: *Mar. 30, 2010

(54) DATA PACKET TRANSMISSION FOR CHANNEL-SHARING COLLOCATED WIRELESS DEVICES

(75) Inventors: Gary S. Rensberger, Redmond, WA (US); Mihai Albulet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

This patent is subject to a terminal disclaimer.

(21) Appl. No.: 11/548,046

(22) Filed: Oct. 10, 2006

(65) Prior Publication Data

US 2007/0133663 A1    Jun. 14, 2007

Related U.S. Application Data

(63) Continuation of application No. 10/139,206, filed on May 7, 2002, now Pat. No. 7,170,870.

(51) Int. Cl.
*H04W 4/00* (2009.01)

(52) U.S. Cl. .................. 370/328; 370/338; 345/163; 345/168

(58) Field of Classification Search .......... 370/327, 370/338, 347, 349, 394, 477; 345/158, 159, 345/163, 168, 169; 714/748–758; 725/119–120
See application file for complete search history.

(56) References Cited

U.S. PATENT DOCUMENTS

| | | | |
|---|---|---|---|
| 4,124,778 A | 11/1978 | Amass et al. | |
| 4,422,171 A | 12/1983 | Wortley et al. | |
| 4,482,999 A * | 11/1984 | Janson et al. | 370/452 |
| 4,631,695 A | 12/1986 | Kozlik et al. | |
| 4,752,841 A * | 6/1988 | Syracuse et al. | 360/49 |
| 5,001,653 A | 3/1991 | Buchanan et al. | |
| 5,537,414 A | 7/1996 | Takiyasu et al. | |
| 5,677,918 A * | 10/1997 | Tran et al. | 714/748 |
| 6,049,530 A * | 4/2000 | Petersen et al. | 370/248 |
| 6,144,291 A | 11/2000 | Odinak et al. | |
| 6,172,972 B1 | 1/2001 | Birdwell et al. | |
| 6,317,714 B1 | 11/2001 | Del Castillo et al. | |
| 6,335,933 B1 | 1/2002 | Mallory | |
| 6,421,387 B1 * | 7/2002 | Rhee | 375/240.27 |
| 6,628,641 B1 * | 9/2003 | Strawczynski et al. | 370/349 |
| 6,680,955 B1 | 1/2004 | Lee | |
| 6,907,460 B2 | 6/2005 | Loguinov et al. | |
| 7,031,945 B1 | 4/2006 | Donner | |
| 2002/0107830 A1 | 8/2002 | Nanja | |
| 2003/0106067 A1 | 6/2003 | Hoskins et al. | |
| 2003/0210662 A1 | 11/2003 | Rensberger et al. | |
| 2007/0133663 A1 * | 6/2007 | Rensberger et al. | 375/152 |

* cited by examiner

*Primary Examiner*—Ricky Ngo
*Assistant Examiner*—Phuongchau B Nguyen
(74) *Attorney, Agent, or Firm*—Merchant & Gould

(57) ABSTRACT

Interference between collocated wireless devices sharing the same RF channel is avoided or minimized by a new header format provided for the first data packet in an RF transmission. By inclusion of an invalid pulse in the header of each isolated data packet, an FM receiver that "captures" a desired signal from a closest device, midstream of processing an undesired signal (pertubation) from a more distant collocated device, is caused to abort the invalid packet and reinitialize. The receiver is then able to properly process the first packet in the desired transmission (from the closest device).

20 Claims, 3 Drawing Sheets

DATA PACKET TRANSMISSION FOR CHANNEL-SHARING COLLOCATED WIRELESS DEVICES

This application is a continuation of application Ser. No. 10/139,206, filed May 7, 2002, now U.S. Pat. No. 7,170,870.

FIELD OF THE INVENTION

The present invention relates to wireless data input devices, particularly relatively low-cost, low data rate wireless data input devices such as computer mice, trackballs, touchpads, keyboards, etc. More specifically, the invention relates to approaches for allowing the coexistence of such collocated wireless devices sharing the same RF channel.

BACKGROUND OF THE INVENTION

Due to specific design requirements, cost constraints, and international regulations, low-cost, low-data rate user input devices, e.g., mice and keyboards, for use with a host computer, use a limited number of RF channels, very often only one or two. Consequently, especially in an office environment, RF interference generated by collocated devices is potentially a serious problem. Some users of wireless input devices in an office environment complain of coexistence issues which, in the case of a computer mouse or the like, usually manifest as missed button presses.

FIG. 1 illustrates an exemplary arrangement of a mouse 1 having an RF data link to a host computer 3. Mouse 1 includes within its housing a radio transmitter that transmits RF signals to a receiver 5 that connects to host computer 3 with a universal serial bus (USB) cable or the like. Mouse 1 may be used in an ordinary fashion, e.g., a user can move a cursor across a computer display screen 9 by moving the mouse over a flat surface, and can control the actions of an on-screen cursor in a conventional "point and click" manner. When a user moves mouse 1 and clicks its buttons, mouse 1 generates binary data representing this activity. A processor within the mouse encapsulates the data into packets, and sends the packets to receiver 5 as radio frequency (RF) signals. A processor within receiver 5 decodes the data and passes it on to host computer 3.

FIG. 1 further illustrates a keyboard 11 having an RF data link to host computer 3. A transmitter within keyboard 11 transmits an RF signal to RF receiver 5. Key-press data is encapsulated by a processor of the keyboard into data packets that are transmitted by the transmitter for receipt and decoding by a processor of receiver 5.

An exemplary data encoding scheme often utilized for transmission of data by wireless data input devices, such as mouse 1 and keyboard 11, is known as Data Difference Modulation (DDM). The Data Difference Modulation (DDM) scheme consists of four symbols, expressed as the time difference between state transitions. The encoded signal appears as a series of "0"-"1" or "1"-"0" transitions separated in time. Each transition represents a symbol, which is identified by dividing the elapsed time from the preceding transition by the basic time unit. The basic time unit is denoted with T and represents the shortest symbol duration. The time lengths of each symbol are fractional multiples of this basic unit of time.

The following symbols are used in DDM (see also Table 1 below).

Synchronization (SYNC) Symbol (t=2.5T)
This symbol is used to mark the beginning of a data transmission packet. It is assigned the longest time length of all the symbols in the symbol set because it occurs only once per packet. The SYNC symbol also initializes the last bit state to a binary "0" for data difference calculations Difference Symbol (t=T)
This symbol represents a bit that is the complement of the previous bit. If the previous symbol was a SYNC symbol, the bit represented is "1".

Same-Different Symbol (t=1.5T)
This symbol is used to encode two bits: the first bit is equal and the second bit is the complement of the last bit. If the previous symbol was a SYNC symbol, then the bits represented by this symbol are "01".

Same-Same Symbol (t=2T)
This symbol is used to encode two bits, each equal to the value of the last bit. If the last symbol was a SYNC symbol, the bits represented by this symbol are "00".

TABLE 1

DDM Encoding

| Previous Bit | Current First Bit | Current Second Bit | Symbol | Symbol Length [time units] |
| --- | --- | --- | --- | --- |
| 0 | 0 | 0 | Same-Same | 2 T |
| 0 | 0 | 1 | Same-Different | 1.5 T |
| 0 | 1 | X | Different | T |
| 1 | 0 | X | Different | T |
| 1 | 1 | 0 | Same-Different | 1.5 T |
| 1 | 1 | 1 | Same-Same | 2 T |
| x | x | X | SYNC | 2.5 T |

Trailing Same-Bit Ambiguity

When a finite-length bit stream is DDM encoded, there is a possibility that the last message bit will fall on a new symbol boundary but be of the same value as the last bit (the trailing "same" bit). An ambiguity exists as to which symbol should be used to encode the bit, since both the Same-Different and Same-Same symbols would accurately describe the trailing bit, but each would suggest the existence of an additional bit. This is generally not an issue, because the length of the message to be received is known and the additional bit, if present, can be ignored.

Header and Packet Format

Data packets generally start with a header, e.g., as shown in FIG. 2. The illustrated header consists of a given number of T pulses of predetermined duration (nine in this example, but the number may vary, depending on the specific implementation) and is abbreviated followed by a SYNC pulse and then the actual ("payload") data. FIG. 2 shows an abbreviated sample data packet with only 13 data bits (/1/10/00/1/10/1/10/1/0/; the "/" sign is used to mark the transitions in the data block). Typical mouse or keyboard packets are longer, having 20-50 bits.

As stated above, the data encoding is based on symbol duration and not on symbol level. The logic levels corresponding to the idle state or various symbols cannot be guaranteed. Depending on the specific hardware implementation, the required idle level (i.e., no data to transmit) may be either "Low" or "High," depending on the specific hardware implementation; for power saving reasons, the idle level should be chosen so that the power drawn from the batteries is negligible. After the last valid transition in the data packet, the DATA line may be either "High" or "Low". If more data is available to be sent, the transmission continues from this state, with the first header pulse. If no data is available and the transmitter is to be turned OFF, the data line may have to be toggled to the idle state by an extra pulse. This extra pulse, between the last valid transition in the data packet and the return to idle state transition, should be from 0.5T to T wide. A long pulse is undesirable because it would lengthen the packet and thus have a negative impact on latency and power consumption. The pulse should be long enough to ensure it is transmitted correctly over the radio link; otherwise the receiver could miss it, causing an error in the packet. This pulse does not have to be decoded in the receiver; it simply serves to ensure that a first edge is not missed.

The Logical Layer of the Protocol

The length and format of the useful data block in the packet (the "payload" data) depend on the application's specific requirements and are not directly relevant to the matter discussed here. Besides the payload data, the data packet includes an ID code—a unique address associated with the transmitter and the receiver paired together. The ID code is typically not truly unique, as this would require using a large number of bits. For typical applications, only 8 to 12 bits are used for the ID code. This is enough to ensure that the probability of two collocated devices, e.g., computer mice or keyboards, having the same ID is reasonably low.

When several wireless data input devices are collocated and share the same RF channel, one receiver can receive the "desired" signal (the signal coming from the paired transmitter) but also "perturbations" (signals coming from other collocated transmitters). When a packet is received, the receiver will check packet's ID and decide whether the packet is a perturbation or desired signal. With a typical arrangement, the receiver listens to all the traffic on the RF channel and processes the packets sent on that channel, at least up to the point where the receiver can identify the ID code.

In addition to the ID code, the data block typically includes some kind of checksum or CRC to verify that the received packet has no errors. For relatively simple device applications, such as computer pointing devices and keyboards, simple error detection is usually sufficient and error correction is generally not employed. (Error correction would require redundant bits in the data packet and more processing power in the receiver.)

Signal Processing in Receiver

Receiver 5 typically includes a radio and a microprocessor for controlling the radio, decoding the demodulating signal, and interfacing with the host PC. Data decoding in the receiver is done by the microprocessor which measures the demodulated data pulse width and compares the results against some fixed thresholds (e.g., 0.75T, 1.25T, 1.75T, 2.25T, 2.75T). Thresholds as mentioned allow for ±0.25T margin for pulse width error (jitter) across the RF link (this includes pulse generation, RF modulation, propagation over air, RF demodulation, digital data recovery, and pulse width measurement). For example, if the measured pulse width is between 1.25T and 1.75T, then the pulse is decoded as 1.5T wide. If the measured pulse width is less then 0.75T or larger than 2.75T, then the current symbol is not a valid symbol.

In the absence of the RF signal, the microprocessor monitors the demodulated data line, waiting for valid header pulses (0.75T-1.25T duration). Although, for the example considered above nine header pulses are transmitted, several of the initial pulses (typically, the first one or two) could be missed by the receiver due to transient effects. Consequently, the receiver waits for only several consecutive valid header pulses (e.g., four or five in the example considered here) before starting the packet decoding process.

Once started, the packet decoding continues until a complete packet is received or until an invalid symbol aborts the decoding process. Note that an invalid symbol may be a symbol narrower than 0.75T or wider than 2.75T, but also a symbol wider than 2.25T if contained in the body of the data block (a SYNC pulse in the middle of the data packet is an invalid symbol).

If a complete packet is received, it is checked for errors and ID. Packets with errors or non-matching ID are rejected. If there are no errors and the packet's ID matches the expected ID, then the data is processed and sent to the host. Finally, the microprocessor returns to the waiting state, waiting for a new packet header.

If the packet is aborted due to an invalid symbol, then no action is taken and the microprocessor reinitializes, e.g., returns immediately to the waiting state.

FSK Modulation and the FM Capture Effect

For relatively low cost, low data rate data communication systems, FSK (Frequency Shift Keying) modulation provides the best cost-performance tradeoff. An important advantage of frequency modulation as compared to amplitude modulation is its relative insensitivity to noise and interference. Of particular interest for the subject discussed here is the phenomenon of "capture" in FM receivers: the stronger of two co-channel signals tends to suppress the output from the weaker one, except when the two are almost identical in signal strength. Typically, a difference of 5-8 dB is enough to ensure the weak signal is suppressed.

The capture phenomenon allows simultaneous FM radio links to be established in the same physical area on the same RF channel if the relative positioning of the transmitters and receivers is such that the "desired" signal for each receiver is stronger than the "perturbations".

The example in FIG. 3 illustrates a possible situation with two independent radio links. Radio link #1 is established between Transmitter #1 and Receiver #1, placed at distance D11 from one another. Radio link #2 is established between Transmitter #2 and Receiver #2, placed at distance D22 from one another. The two transmitters and the two receivers coexist in the same area (both receivers are in the operating range of both transmitters) and the radios all work on the same RF channel. For simplicity, assume that the two receivers are similar (same sensitivity) and the two transmitters are also similar (same radiated power).

For Receiver #1, Transmitter #1 transmits the desired signal while Transmitter #2 is the perturbation. For Receiver #2, Transmitter #2 transmits the desired signal while Transmitter #1 is the perturbation. If at a given moment, Transmitter #1 is OFF, then Receiver #1 is able to receive and decode the signal transmitted by Transmitter #2 (the perturbation). But of course, because the ID codes are different, Receiver #1 will ignore the packets received from Transmitter #2. When Transmitter #1 is turned ON, if D11<D12, the desired signal at Receiver #1 is stronger than the perturbation and can be received due to the FM capture effect. In conclusion, if D11<D12 and D22<D21, then the desired signal is stronger than the perturbation and both radio links can be operated simultaneously.

The Problem

The FM capture effect discussed above will allow simultaneous links on the same channel, as long as the transmitters transmit continuously. However, if the transmitters are turned OFF when the wireless device is in standby, and turned ON only when data is available (which is desirable, for power saving reasons), the first packet in the RF transmission may be lost if at least one of the collocated transmitters is ON at that moment. FIGS. 4 and 5 illustrate how this could happen.

In both of the examples illustrated in FIGS. 4 and 5, it is assumed the desired transmitter is initially OFF and is turned ON eventually, while another transmitter in the area is ON all the time, or at least at the moment when the desired transmission starts. Missing the first packet in a transmission could be disturbing and inconvenient for the user. For instance, a wireless keyboard typically transmits isolated packets. A wireless mouse may also transmit isolated packets for button actuations. If an isolated packet is missed, the associated user action is of no effect and must be reexecuted by the user.

In the first example illustrated in FIG. 4, the receiver monitors the traffic on the RF channel and decodes the data coming from another transmitter (the "perturbation" in FIG. 4). As long as the desired transmitter is OFF, the radio receiver output follows the perturbation. These packets are sent with a different ID, so no action is actually taken by the receiver; nonetheless, it listens to and decodes the packets. When the desired signal starts, the receiver "captures" it, and the receiver output follows the desired signal. In the example depicted in FIG. 4, the relative timing of the two signals (perturbation and desired signal) happens to be such that a short pulse is generated at the receiver output. This invalid symbol (shorter than 0.75T) will cause the receiver to abort processing the current packet and return to the waiting state, i.e., reinitialize. As a result, the receiver can process and decode the first packet in the desired transmission, so long as sufficient header pulses of the desired signal are received following the reinitialization.

In the example of FIG. 5, the relative timing of the two signals (perturbation and desired signal) happens to be such that no invalid pulse is generated at the receiver output when the desired signal is captured. Consequently, the receiver will continue processing the current packet (as if it were part of the previously processed perturbation signal), possibly up to the SYNC symbol in the desired packet. SYNC is an invalid symbol (when in the body of the data block) and causes the receiver to abort the current packet and return to the waiting state. The first packet in the desired transmission is lost in this case, since reinitialization has occurred after the header of the desired signal has already passed. Note that there are several other possible scenarios for the case depicted in FIG. 5. For instance, the packet in process may be almost completed when the desired signal starts. In this case, the current packet may be completed after a few more pulses and then rejected because of errors or non-matching ID. The receiver returns to the waiting state and may still be able to receive enough header pulses to decode the first packet in the desired transmission.

The waveforms shown in FIGS. 4 and 5 assume that the receiver instantly "captures" the stronger (desired) signal. In fact, this is generally not the case, because of the transient regime when the RF signal changes suddenly. For a short time after the desired signal starts (typically, one to two header pulses), the receiver output is unpredictable. In some cases valid symbols are generated; in other cases, invalid symbols may be generated.

SUMMARY OF THE INVENTION

The present invention addresses the above-described problem of interference between collocated wireless devices sharing the same RF channel. According to the invention, a new header format is provided for the first data packet in a transmission. By inclusion of trigger data, e.g., an "invalid" pulse, in the header of each isolated packet, the receiver is caused to reinitialize and is then able to properly process the first packet in the desired transmission.

In a first aspect, the invention is embodied in a wireless data input device system. The system includes an input data generator; a first processor for packetizing input data received from the input data generator into data packets comprising header data and payload data; a transmitter for wirelessly transmitting the data packets; a receiver for receiving the data packets transmitted by the transmitter; and a second processor for processing the data packets received by the receiver. The header data comprises trigger data serving to trigger a reinitialization of the processing of data packets by the second processor.

In a second aspect, the invention is embodied in a method of wireless data packet transmission. The method includes the steps of: generating input data; packetizing the input data into data packets comprising header data and payload data; wirelessly transmitting the data packets; receiving the transmitted data packets; and processing the received data packets. The header data comprises trigger data serving to trigger a reinitialization of the processing of the data packets.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

Figure 1:
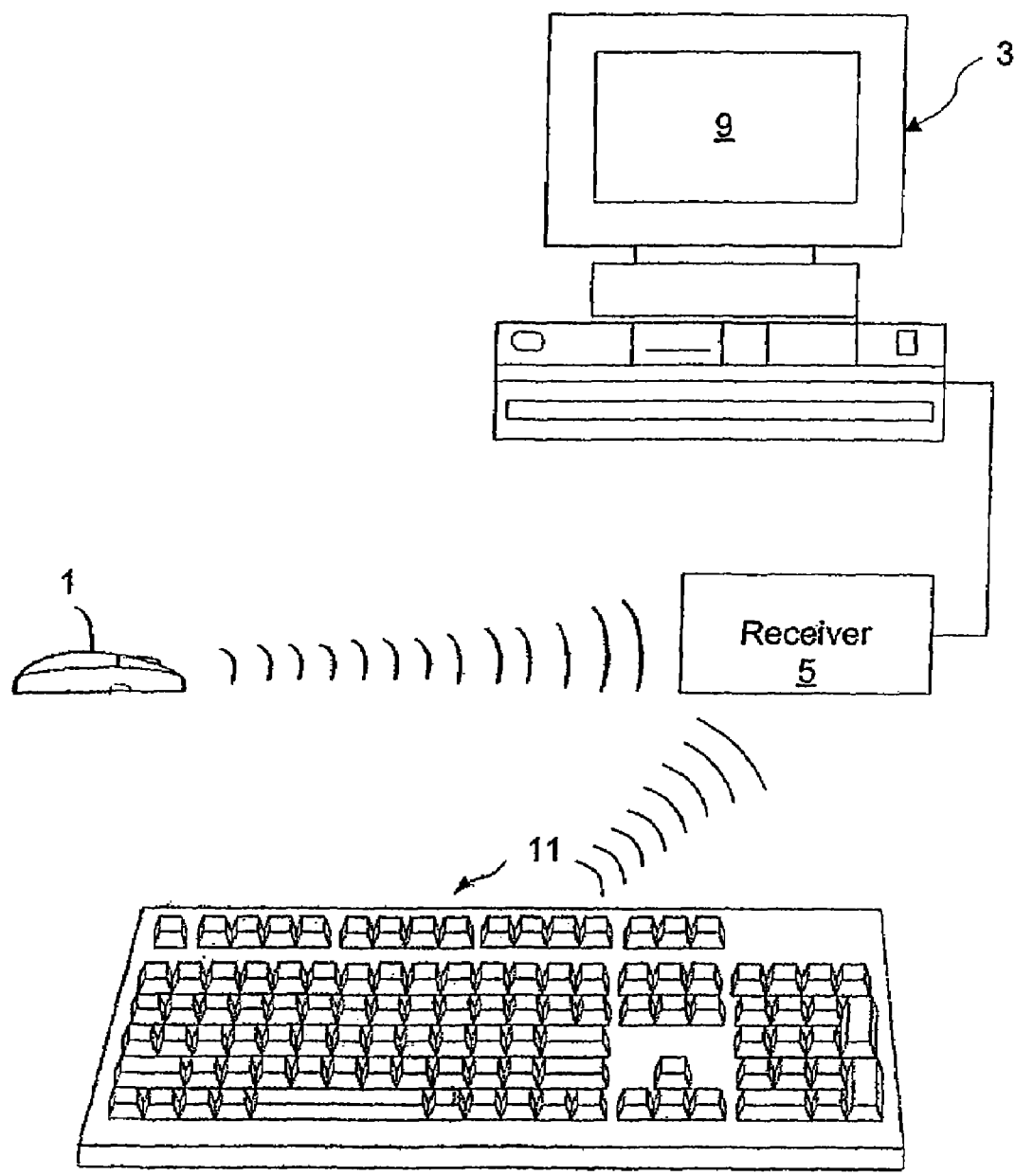
FIG. 1 is a diagrammatic view of a host computer to which an associated mouse and keyboard are wirelessly linked by way of RF transmitter/receiver pairs.
Figure 2:
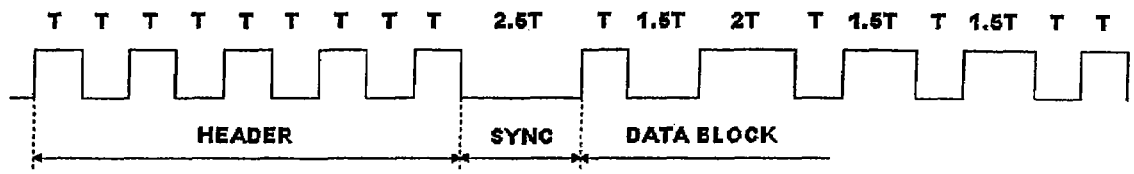
FIG. 2 shows a waveform representative of an RF data packet transmitted by a wireless data input device utilizing Data Difference Modulation (DDM) encoding.
Figure 3:
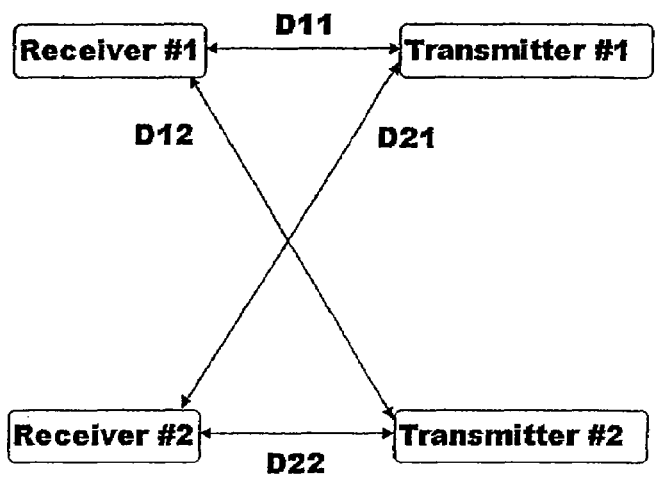
FIG. 3 shows an example of two simultaneous FM radio links established by two wireless devices with two respective receivers collocated in the same physical area and communicating on the same RF channel.
Figure 4:
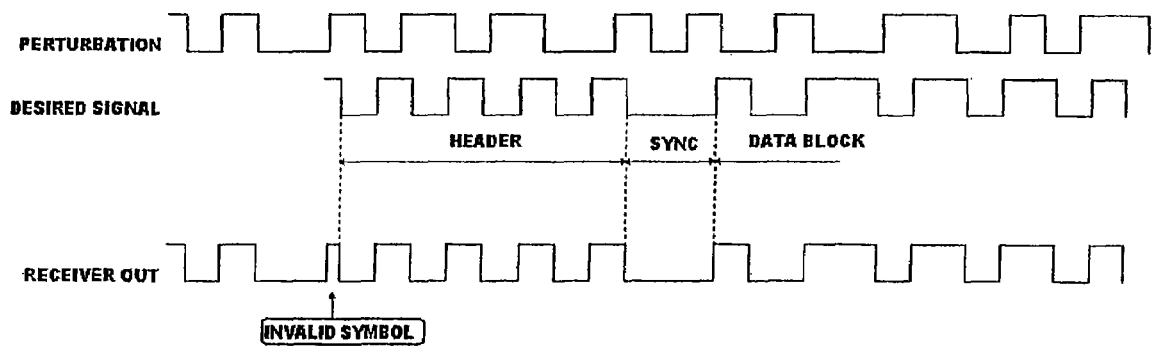
FIG. 4 illustrates an example of overlapping signal transmissions (desired signal and pertubation) generated by collocated wireless devices as illustrated in FIG. 3, wherein due to the timing the first packet in the desired signal can be decoded.
Figure 5:
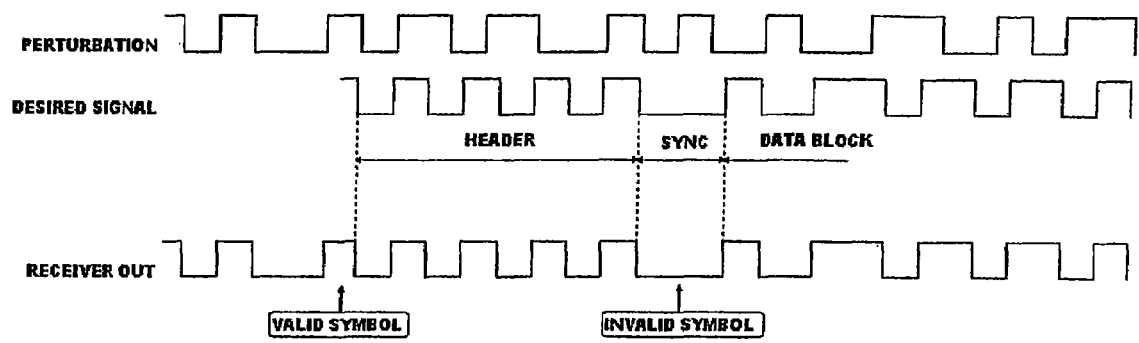
FIG. 5 illustrates an example of overlapping signal transmissions (desired signal and pertubation) generated by collocated wireless devices as illustrated in FIG. 3, wherein due to the timing the first packet in the desired signal may not be decoded.

An implementation of the present invention in connection with a Data Difference Modulation (DDM) encoding scheme is described by way of example and to provide a discussion frame. For a more detailed discussion of DDM encoding and its advantages relative to other encoding schemes, reference is made to commonly owned Del Castillo et al. U.S. Pat. No. 6,317,714.

The invention may be advantageously applied to various types of wireless data input devices, including but not limited to mouse 1 and computer keyboard 11, which may be used in collocation, i.e., within signal range of each other. In the case of a computer pointing device, the payload data of the transmitted data packets comprise, e.g., data indicative of displacement of the device itself or an operation instrumentality thereof, which is used to control cursor position. The payload data may further be indicative of button press activity and scroll wheel displacement, for example. In the case of a keyboard, the payload data includes, but is not necessarily limited to, data indicative of character and function key-press information.

Various means may be utilized for generating this payload data, as are known in the art. For example, in the case of a computer mouse, an optical controller IC may form part of an optical tracking engine, controlling illumination of a LED light source which is used to illuminate a trackable surface (e.g., a desktop). The IC may also process signals received from an image detector (which may be included as part of the IC) that receives light reflected from the trackable surface. The images may be processed by the IC using spatial correlation to determine relative displacement values, in pixel or sub-pixel intervals. A stream of relative displacement values may be communicated by the IC to a µP of the mouse, for further processing of the signals into data packets used by the host computer to control the movement of a displayed mouse cursor. The µP may also control the RF transmission section of the mouse to transmit the data packets to the host computer.

In a typical implementation, mouse 1 may have right and left buttons and a depressible, rotatable scroll wheel located therebetween. Obviously, mouse 1 may have more actuators (such as thumb actuation buttons or more finger actuation buttons), fewer actuators (such as only a single button or two buttons) or different types of actuators (such as triggers, rollers, etc.). Mouse 1 may instead be another type of cursor control (pointing) device, such as a trackball or touch pad device.

As another example, in the case of a keyboard as the data input device, the computer industry has largely settled on using a n×m matrix of sense lines/drive lines for carrying out keyboard key switch discrimination. Such a matrix provides a means for an integrated circuit (IC) micro-controller device provided as part of the keyboard to decode (n×m) keyboard keys, with (n+m) electrical interface pins. The micro-controller device sequentially drives a voltage on a plurality of drive lines of the matrix. Keyboard key depression will effect a closure of an associated switch creating an electrical connection between a particular drive line and one of a plurality of sense lines, with the result that the micro-controller device will detect this voltage on the sense line and be able to determine therefrom a corresponding alphanumeric character or function.

Other types of wireless input devices to which the present invention may be applied include gaming devices, pens, tablets, etc.

A processor associated with the wireless data input device, e.g., mouse 1 or keyboard 11, encapsulates the data into packets, and an RF transmitter sends the packets to receiver 5 serially utilizing a known encoding scheme, such as DDM or the other techniques mentioned below. As is well known in the art, each data packet that is transmitted has at its front end a header which identifies the beginning of a new data packet. As has been described, with DDM encoding, the header comprises a series of pulses having a duration T.

In accordance with the invention, a unique header format addresses the problem discussed in Background section. A basic principle of the invention is to introduce, into the first header of a (preferably each) continuous data transmission, a signal component that will trigger reinitialization of the receiver's signal processor. This is done in such a manner that the receiver can restart its processing with a sufficient amount of header data remaining in the desired signal to permit that signal to be properly identified and processed. In this manner, the undesirable drop of an initial data packet (as may otherwise occur with collocated devices, notwithstanding the FM capture effect and use of unique transmission identifying codes) may be avoided. The particular format of the header modification may vary dependent on the encoding scheme that is utilized.

While it is foreseen that the invention will have its most useful application in short range, low data rate, low cost devices employing frequency modulation (FM), the invention is not so limited. Potentially, the invention could be used with any form of modulation, such as amplitude modulation (AM) or phase modulation (PM). PM is to some extent similar to FM, but AM systems do not benefit from the capture effect, so the desired transmitter would generally have to be much closer to the receiver than the sources of perturbation, in order to allow for simultaneous radio links. Even so, the same basic principle will work in this case too.

Figure 6:
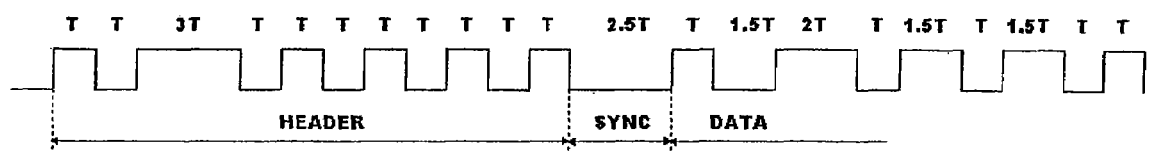
FIG. 6 shows a modified header using one 3T "invalid symbol" pulse in accordance with the invention, which permits the first packet in the desired signal to be decoded.

FIG. 6 illustrates one example, in the context of an FM radio system utilizing DDM encoding. In this example, the first two header pulses are left unmodified, while the third header pulse is replaced with a 3T pulse. This change is preferably applied only to the header of the first packet in a transmission, i.e., the header produced immediately after the transmitter is turned ON. The headers of the subsequent packets in a continuous transmission preferably are not modified. In a typical wireless data input device system, in order to conserve power, the transmitter is turned OFF during periods of inactivity. Once activity is sensed, e.g., mouse movement or button press activity, the transmitter is powered-up. The transmitter remains powered up so long as reportable activity persists, and is powered down once the reportable activity ceases. In a preferred implementation of the invention, the reinitialization triggering header modification (whatever its form) is made only to each header immediately following a power-up of the transmitter.

As a result of the above-described header modification, the length of the first packet is increased by 2T. This is normally not of significant consequence, as the additional RF latency and power consumption is minimal. As an alternate approach, two pulses can be eliminated (usually, without any negative effect) from the header of the first packet to keep the same packet length. The basic idea here is to start the header of every isolated packet with a pulse that causes the receiver to reinitialize (i.e., an "invalid" pulse). Placing the invalid pulse after the first two header pulses allow the transient regime in the receiver to stabilize, so that the receiver can process correctly the invalid 3T pulse. If necessary, more than two pulses can be placed before the invalid pulse to allow the transient regime in the receiver to stabilize, although this would lengthen the data packet.

In the example shown in FIG. 6, the 3T pulse will appear as an invalid pulse to the receiver. Consequently, the receiver will abort the packet in process (which started with the pertubation and switched over to the desired signal, by virtue of the FM capture effect) and will reinitialize with processing of the first packet in the desired transmission. The receiver will recognize the packet of the desired transmission without difficulty so long as a design dependent number of header pulses (e.g., 5-6 pulses) remain in the desired transmission following the reinitialization.

Figure 7:
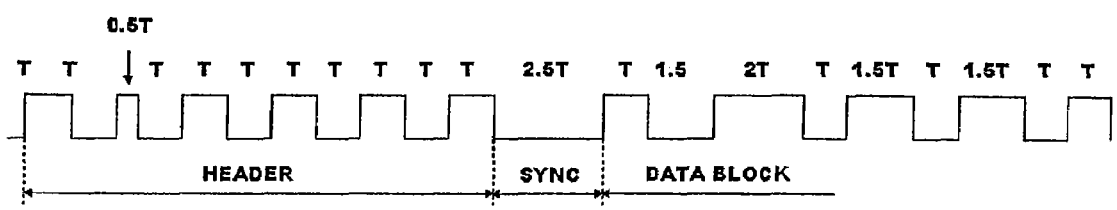
FIG. 7 shows a modified header using one 0.5T "invalid symbol" pulse in accordance with the invention, which permits the first packet in the desired signal to be decoded.

Various pulse durations or other signal characteristics which are resolvable as an error condition, or a reinitialization flag, may be utilized as the "invalid" pulse, depending on the particular encoding scheme and RF transmission system being utilized. As applied to a DDM encoding scheme, a pulse duration of 3T can be easily recognized as an invalid pulse, without extending the header length substantially. Alternatively, a 0.5T pulse may be utilized as the invalid pulse, as shown in FIG. 7, resulting in less header length extension. However, a 0.5T pulse would require twice the bandwidth in the radio link, and may not be so readily recognized (resolvable) as an invalid pulse.

It will be understood that the principles of the invention are applicable to various other encoding techniques, including but not limited to NRZ encoding and the encoding schemes described in commonly owned Odinak et al. U.S. Pat. No. 6,144,291. With respect to the Manchester II and Miller encoding techniques mentioned in the background section of the '291 patent, assuming the bit time is "T", then the longest time between two subsequent transitions is T (Manchester II) or 2T (Miller). In these cases, e.g., the invalid symbol could be 2T (Manchester II) or 3T (Miller). When NRZ encoding is used, synchronization may be lost after a long string of ones or zeros. To prevent this, after a given number of consecutive ones or zeros, the other bit is inserted in the data sequence to force a transition. As an example, assume that a transition is forced after four consecutive identical bits. In this case, a 5T symbol could be used as the invalid symbol. The same idea could be used for NRZI encoding (NRZI=non return to zero invert; a "1" is represented by no change in level and a "0" is represented by a change in level). A string of ones causes long periods with no transition in the data. In order to ensure adequate signal transitions, a "bit stuffing" technique similar to that employed with NRZ encoding is employed by the transmitting device. A zero is inserted after every "N" consecutive ones in the data stream before the data is NRZI encoded, to force a transition in the NRZI data stream. (Of course, the receiver must recognize the stuffed bits and discard them.) In this case, a symbol which is (N+1)*T long can be used as the invalid symbol.

The present invention has been described in terms of preferred and exemplary embodiments thereof. Numerous other embodiments, modifications and variations within the scope and spirit of the appended claims will occur to persons of ordinary skill in the art from a review of this disclosure.

The invention claimed is:

1. A wireless data input device system, comprising:
   an input data generator;
   a first processor for packetizing input data received from said input data generator into data packets comprising header data, a sync signal and payload data;
   a transmitter for wirelessly transmitting said data packets;
   a receiver for receiving the data packets transmitted by said transmitter; and
   a second processor for processing the data packets received by said receiver;
   wherein, said header data comprises trigger data provided in advance of the sync signal, said trigger data serving to trigger a termination of processing of a packet in process and a reinitialization of the processing of data packets by said second processor wherein said trigger data is included in a first header of a continuous data transmission, and is omitted from the headers of subsequent packets in the continuous data transmission.

2. The wireless data input device system of claim 1, wherein said transmitter transmits, and said receiver receives, RF signals.

3. The wireless data input device system of claim 2, wherein said RF signals are FM signals.

4. The wireless data input device system of claim 3, wherein the FM signals are frequency shift keying (FSK) modulated signals.

5. The wireless data input device system of claim 1, wherein said first processor generates valid header data in the form of pulses of predetermined duration, and said trigger data comprises an invalid pulse having a duration different than the pulse duration of said valid header data.

6. The wireless data input device system of claim 5, wherein said invalid pulse has a duration longer than the pulse duration of said valid header data.

7. The wireless data input device system of claim 5, wherein said invalid pulse has a duration shorter than the pulse duration of said valid header data.

8. The wireless data input device system of claim 5, wherein said first processor encodes, and said second processor decodes, said payload data utilizing Data Difference Modulation (DDM).

9. The wireless data input device system of claim 1, wherein said device comprises a computer pointing device.

10. The wireless data input device system of claim 1, wherein said device comprises a computer keyboard.

11. A method of wireless data packet transmission, comprising:
   generating input data;
   packetizing said input data into data packets comprising header data, a sync signal and payload data;
   wirelessly transmitting said data packets;
   receiving the transmitted data packets; and processing the received data packets;
   wherein, said header data comprises trigger data provided in advance of the sync signal, said trigger data serving to trigger a termination of processing of a packet in process and a reinitialization of the processing of the data packets wherein said trigger data is included in a first header of a continuous data transmission, and is omitted from the headers of subsequent packets in the continuous data transmission.

12. The method of claim 11, wherein said data packets are transmitted as RF signals.

13. The method of claim 12, wherein said RF signals are FM signals.

14. The method of claim 13, wherein the FM signals are frequency shift keying (FSK) modulated signals.

15. The method of claim 13, wherein valid header data is generated in the form of pulses of predetermined duration, and said trigger data comprises an invalid pulse having a duration different from the pulse duration of said valid header data.

16. The method of claim 15, wherein said invalid pulse has a duration longer than the pulse duration of said valid header data.

17. The method of claim 15, wherein said invalid pulse has a duration shorter than the pulse duration of said valid header data.

18. The method of claim 17, wherein said payload data is encoded and decoded utilizing Data Difference Modulation (DDM).

19. The method of claim 11, wherein said generating input data step is performed by way of user interaction with a computer pointing device.

20. The method of claim 11, wherein said generating input data step is performed by way of user interaction with a computer keyboard.

* * * * *